United States Patent Office 3,557,152
Patented Jan. 19, 1971

3,557,152
5-(2-BROMOMETHYL OR CHLOROMETHYL-2-BROMO OR CHLORO ALKANOYL) BENZO-FURAN-2-CARBOXYLIC ACIDS
Janos Zergenyi, Riehen, and Ernst Habicht, Oberwil Switzerland, assignors to Geigy Chemical Corporation, Ardsley, N.Y., a corporation of New York
No Drawing. Filed July 22, 1968, Ser. No. 746,267
Claims priority application Switzerland, July 28, 1967, 10,764/67
Int. Cl. C07d 5/40
U.S. Cl. 260—346.2
2 Claims

ABSTRACT OF THE DISCLOSURE

5 - (2 - bromo-2-bromomethyl-alkanoyl)-benzofuran-2-carboxylic acids and their pharmaceutically acceptable salts with bases have diuretic and saluretic activities. A typical embodiment is 5-(2-bromo-2-bromomethyl-butyryl) - 6 - methyl-benzofuran-2-carboxylic acid. A method of producing a diuretic and simultaneously a saluretic effect comprising administering said compounds to warm-blooded animals as well as pharmaceutical composition containing said compounds are provided.

DETAILED DESCRIPTION

The present invention concerns heterocyclic carboxylic acids, a method of producing diuresis and saluresis, as well as pharmaceutical compositions.

More particularly the present invention pertains to heterocyclic carboxylic acids of the Formula I (I)
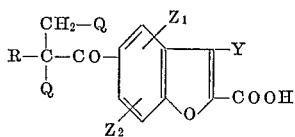

wherein

Q is chloro or bromo,
R is hydrogen or lower alkyl,
Y is hydrogen or methyl, and
each of $Z_1$ and $Z_2$ taken individually is hydrogen, lower alkyl, lower alkoxy, fluoro, chloro or bromo; and the pharmaceutically acceptable salts of said compounds with bases.

It has been found that the new compounds have valuable pharmacological properties. In particular, they have diuretic and saluretic activity. These properties characterise these compounds as suitable for the treatment of disturbances which are due to insufficient excretion of urine and of electrolytes, particularly of sodium chloride. Such disturbances are the cause of oedema and hypertension. These new substances increase considerably the excretion of urine and of sodium and chlorine ions in dogs and in rabbits.

In the heterocyclic carboxylic acids of Formula I, $Z_1$ takes the 4- or 6-position and $Z_2$ the 6- or 7-position. By the term lower alkyl and the derivation thereof using the root "alk," namely alkoxy, is intended a group comprising a straight or branched hydrocarbon chain of from 1 to 4 carbon atoms. Representative of lower alkyl groups are thus, e.g. the methyl, ethyl, propyl, isopropyl, butyl or the tert. butyl group. Embraced by the term lower alkoxy are such groups as the methoxy, ethoxy, propoxy, isopropoxy, butoxy or the sec. butoxy group.

Compounds of the Formula I are produced according to a first process by adding halogen to a compound of Formula II

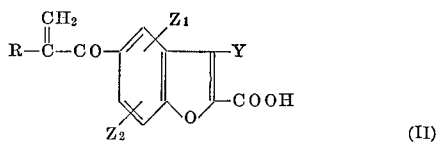

wherein R, Y, $Z_1$ and $Z_2$ have the meanings given in Formula I.

This addition of halogen is carried out e.g. by adding the equimolar amount of chlorine or bromine to the stirred solution of the compound of Formula II in an appropriate solvent, such as e.g. glacial acetic acid, nitrobenzene or a halogenated hydrocarbon.

The starting material of Formula II can be produced in a first process by reacting, according to Friedel-Crafts, a compound of Formula III

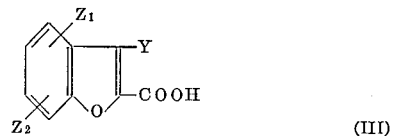

wherein Y, $Z_1$ and $Z_2$ have the meanings given in Formula I, with a carboxylic acid halide of Formula IV

or with a carboxylic acid anhydride of Formula V

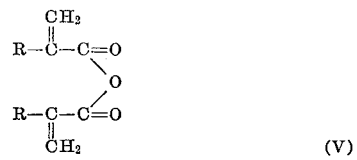

wherein R has the meaning given in Formula I, and Q' represents a halogen atom.

Starting materials of Formula III are described in the literature, e.g. benzofuran-2-carboxylic acid [cf. R. Fittig et al., Ann. Chem. 216, 162 (1883)], 6-methyl-benzofuran-2-carboxylic acid [cf. K. von Auwers, Ann. Chem. 408, 255 (1915)] and 4,6-dimethyl-benzofuran-2-carboxylic acid (cf. F. M. Dean et al., J. Chem. Soc. 1953, 1250). These compounds can be acylated in the 4-position, e.g. according to Friedel-Crafts in the presence of aluminum chloride in nitrobenzene.

As halogen, Q, is preferably chlorine or bromine. Suitable catalysts for the reaction according to Friedel-Crafts are, e.g. in particular aluminum chloride and stannic chloride, also zinc chloride, concentrated sulfuric acid, phosphoric acid, polyphosphoric acid or pyrophosphoric acid. The acids mentioned are used, preferably, when a carboxylic acid anhydride is the acylating agent. The reaction is referably performed in a solvent. As such can be used, e.g. aliphatic or cycloaliphatic hydrocarbons such as heptane or cyclohexane, nitrated hydrocarbons such as nitromethane, nitrocyclohexane or nitrobenzene, or halogenated hydrocarbons such as carbon tetrachloride, ethylene chloride, methylene chloride, o-dichlorobenzene and carbon disulfide.

Advantageously the starting materials of Formula II can also be produced by a second process. Reacting according to Friedel-Crafts a compound of Formula III with a carboxylic acid chloride of Formula VI

wherein R has the meaning given in Formula I, with aluminum chloride in nitrobenzene, yields a compound of Formula VII

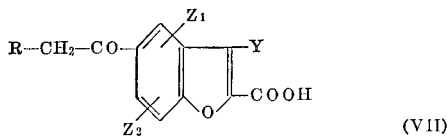
(VII)

wherein R, Y, $Z_1$ and $Z_2$ have the meanings given under Formula I. These 5-alkanoyl compounds are then reacted with formaldehyde or paraformaldehyde and a secondary amine to give the corresponding Mannich bases of Formula VIII

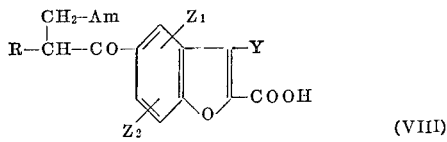
(VIII)

wherein R, Y, $Z_1$ and $Z_2$ have the meanings given under Formula I and Am represents a tertiary amino group, respectively the acid addition salts thereof. Suitable secondary amines are e.g. dimethylamine, diethylamine, pyrrolidine, piperidine, morpholine or hexahydro-1H-azepine.

The Mannich derivatives of Formula VIII, respectively their acid addition salts, are isolated or used as raw products in the next step. They are in a simple manner transformed to the corresponding methylene compounds of Formula II by heating them in the presence of a weak base in a solvent containing hydroxyl groups.

Examples of weak bases are sodium acetate or sodium hydrogen carbonate; they are preferably used in water or lower fatty acids, e.g. in glacial acetic acid.

Compounds of Formula I can be obtained according to a second process by reacting a compound of Formula III according to Friedel-Crafts with carboxylic acid chlorides of Formula IX

(IX)

wherein R and Q have the meanings given in Formula I. For the formation of pharmaceutically acceptable salts can be used inorganic or organic bases, such as alkali or alkaline earth hydroxides, carbonates or bicarbonates, e.g. the sodium, potassium, magnesium or calcium derivatives, triethanolamine or choline. Such salts of bases are produced by mixing the compound of Formula I with the equivalent amount of the desired base in a suitable solvent such as water, mixtures of water with an organic solvent or in organic solvents alone such as methanol, ethanol or propanol and isolating the salts formed in a conventional manner.

The compounds of the invention have been found to have valuable pharmacological properties, especially diuretic and saluretic activities combined with a very low order of toxicity. These favourable properties render the compounds of Formula I and their pharmaceutically acceptable salts with bases suitable for the treatment of disturbances which are due to insufficient excretion of urine and of electrolytes, particularly of sodium chloride. Such disturbances are the cause of oedema and hypertension.

The diuretic and saluretic effects of the compound of the invention are illustratively demonstrated in dogs and rabbits. Thus it can be shown by conventional pharmacological experiments that 5-(2-bromo-2-bromethyl-butyryl)-6-methyl-benzo-furan-2-carboxylic acid administered orally or parenterally in amounts of 5 mg./kg. to dogs and rabbits increase the excretion of urine and simultaneously of sodium and chlorine ions to a considerable extent. At the same no noticeable side effects are observed.

The new active substances or the pharmaceutically acceptable salts thereof are preferably administered orally.

The daily dosages vary between 50 and 1000 mg. for warm-blooded animals. Suitable dosage units such as dragées and tablets, preferably contain 25–500 mg. of an active substance according to the invention, i.e. 20–80% of a compound of Formula I. They are produced by combining the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Other suitable dosage units are hard gelatine capsules as well as soft closed capsules made from gelatine and a softener, such as glycerine. The hard gelatine capsules preferably contain the active substance as a granulate, e.g. in admixture with fillers such as maize starch, and/or lubricants such as talcum or magnesium stearate and, optionally, stabilisers such as sodium metabisulfite $$(Na_2S_2O_5)$$

or ascorbic acid. In soft gelatine capsules, the active substance is preferably dissolved or suspended in suitable liquids such as liquid polyethylene glycols to which stabilisers can also be added.

The following examples further illustrate the production of the new compounds of Formula I of hitherto undescribed intermediate products, as well as the production of pharmacological compositions, but these are by no means the sole methods of producing same. The temperatures are given in degrees centigrade.

EXAMPLE 1

(a) A solution of 0.65 g. of bromine in 1 ml. of chloroform is added dropwise at room temperature to a stirred solution of 1.0 g. of 5-(2-methylene-butyryl)-6-methyl-benzofuran-2-carboxylic acid. This addition takes 5 minutes and the reaction mixture is left to stand for 20 minutes. The chloroform is then evaporated under reduced pressure and the residue is recrystallised from ethyl acetate. Thus 5-(2-bromo-2-bromomethyl-butyryl)-6-methyl-benzofuran-2-carboxylic acid is obtained, which melts with decomposition at 193–195°.

Analogously to this example the following compounds are produced:

(b) 5-(2 - bromo - 2 - bromomethyl-butyryl) - 6 - ethoxy-benzofuran - 2 - carboxylic acid, M.P. 174–176° dec. (benzene-heptane), starting from 5-(2-methylene-butyryl)-6-ethoxy-benzofuran-2-carboxylic acid;

(c) 5-(2 - bromo-2-bromomethyl-propionyl)-6-methyl-benzofuran-2-carboxylic acid, M.P. 210–211° dec. (ethyl acetate), starting from 5-(2 - methylene - propionyl)-6-methyl-benzofuran-2-carboxylic acid;

(d) 5-(2 - bromo - 2 - bromomethyl-butyryl) - 3,6-dimethyl-benzofuran-2-carboxylic acid, M.P. 193–194° dec. (benzene), starting from 5-(2 - methylene-butyryl) - 3,6-dimethyl-benzofuran-2-carboxylic acid;

(e) 4-chloro - 5 - (2 - bromo-2-bromomethyl-butyryl)-benzofuran-2-carboxylic acid, M.P. 193–194° dec. (benzene), starting from 4-chloro - 5 - (2-methylene-butyryl)-benzofuran-2-carboxylic acid;

(f) 5-(2 - bromo - 2 - bromomethyl-valeroyl) - 6-methyl-benzofuran-2-carboxylic acid, M.P. 205–206° dec. (ethyl acetate), starting from 5-(2 - methylene-valeroyl)-6-methyl-benzofuran-2-carboxylic acid.

EXAMPLE 2

A stream of gaseous chlorine is blown at room temperature into a stirred solution of 1.1 g. of 5-(2-methylene-butyryl)-6-ethyl-benzofuran-2-carboxylic acid in 20 ml. of chloroform. The introduction of chlorine is interrupted when a persisting yellow colouring in and above the solution is attained. The reaction mixture is then stirred for 15 minutes. After this, the chloroform is removed in vacuo and the residue is recrystallised from benzene-hexane. Thus 5 - (2 - chloro - 2 - chloromethylbutyryl)-6-ethyl-benzofuran-2-carboxylic acid is obtained, M.P. 158–159°.

The following examples describe the production of starting materials and intermediates.

EXAMPLE 3

5-alkanoyl-benzofuran-2-carboxylic acids (a) To a stirred suspension of 10 g. of 6-methyl-benzofuran-2-carboxylic acid in 30 ml. of nitrobenzene is added at 0° in portions 28 g. of pulverised aluminum chloride whereby care is taken that the temperature remains below 10°. Butyryl chloride (9 g.) is dropped into the mixture at 10° whereupon stirring is continued for 24 hours at room temperature. The mixture is then poured on 300 g. of ice and 50 ml. of concentrated hydrochloric acid and the resulting suspension is extracted with ether. The organic phase is washed with water and re-extracted with aqueous sodium hydrogen carbonate solution. The sodium hydrogen carbonate solution is adjusted to pH 3 with concentrated hydrochloric acid and stirred for one hour whereupon a precipitate is formed which is filtered, washed with water and dissolved in ethyl acetate. This organic solution is dried and evaporated in vacuo. The residue is recrystallised from ethylacetate/dioxan to give 5-butyryl-6-methyl-benzofuran-2-carboxylic acid, M.P. 155–157°.

In analogous manner as described above are prepared the following alkanoyl-benzofuran-2-carboxylic acids:

(b) 5-butyryl-6-ethoxy-benzofuran-2-carboxylic acid, M.P. 203–205° (ethanol), from 6-ethoxy-benzofuran-2-carboxylic acid, butyryl chloride and aluminum chloride.

(c) 5-propionyl - 6 - methyl-benzofuran-2-carboxylic acid, M.P. 180–182° (dioxane), from 6-methyl-benzofuran-2-carboxylic acid, propionyl chloride and aluminum chloride.

(d) 5-butyryl - 3,6 - dimethyl-benzofuran-2-carboxylic acid, M.P. 185–187° (benzene/ethylacetate), from 3,6-dimethyl-benzofuran-2-carboxylic acid, butyryl chloride and aluminum chloride.

(e) 5-valeroyl - 6 - methyl-benzofuran - 2 - carboxylic acid, M.P. 154–155° (ethylacetate), from 6-methyl-benzofuran-2-carboxylic acid, valeroyl chloride and aluminum chloride.

(f) 5-butyryl - 6 - ethyl-benzofuran-2-carboxylic acid, M.P. 152–153° (ethylacetate), from 6-ethyl-benzofuran-2-carboxylic acid, butyryl chloride and aluminum chloride.

5-butyryl - 4-chloro-benzofuran-2-carboxylic acid used in Example 1(e) as starting material is produced as follows:

(g) 80 g. of 2-chloro-4-hydroxy - butyrophenone (cf. Belgian Pat. No. 612,755) are slurried in 400 ml. of water, and 100 ml. of 4 N sodium hydroxide solution are added. A clear solution is formed. 20 g. of sodium borohydride are added and the whole is stirred for 5 hours at room temperature. The solution is then cooled with ice and hydrochloric acid is added dropwise until a pH of 3–4 has been attained. The suspension is stirred for another half hour, whereupon the 3-chloro-4-(1-hydroxy-butyl)-phenol is filtered off under suction. It is used immediately in the crude state.

(h) The moist crystal mass of 3-chloro-4-(1-hydroxy-butyl)-phenol is added to a solution of 200 g. of sodium hydroxide in 500 ml. of water, the solution formed is heated to 70° and 150 g. of chloroform are added dropwise within 2 hours. During the addition, the temperature of the reaction mixture must be 70–80°. The mixture is stirred for 20 minutes at 70° and then cooled to room temperature. The sodium salt of 3-chloro-4-(1-hydroxy-butyl)-2-formyl-phenol precipitates and is filtered off under suction.

This crude sodium salt is slurried in water, the pH is adjusted to 3 with hydrochloric acid and the slurry is extracted twice with ether. The ether extracts are washed with water, dried over magnesium sulfate and concentrated. The residue, crude 3-chloro-4-(1-hydroxy-butyl)-2-formyl phenol (30 g.) is used in the crude state.

(i) 30.0 g. of crude 3-chloro-4-(1-hydroxy-butyl)-2-formyl phenol are dissolved in 100 ml. of methylethyl ketone, 20 g. of potassium carbonate are added and the mixture is refluxed while stirring. 30 g. of bromomalonic acid diethyl ether are then added dropwise within 10 minutes whereupon the reaction mixture is refluxed for 5 hours while stirring. The solvent is then distilled off, the residue is taken up in water, concentrated hydrochloric acid is added until pH 3 is attained and the mixture is extracted twice with ether. The combined ether solutions are washed with water, dried over magnesium sulfate and concentrated. A solution of 20 g. of potassium hydroxide, 20 ml. of water and 200 ml. of ethanol is added to the residue and the mixture is refluxed for 2 hours. 800 ml. of water are then added and the aqueous-alkaline solution is washed twice with ether. The aqueous solution is acidified with concentrated hydrochloric acid and extracted twice with ether. The ether extracts are dried and concentrated. The residue is recrystallize from benzene ethyl acetate to give 8 g. of 4-chloro-5-(1-hydroxy-butyl)-benzofuran-2-carboxylic acid, M.P. 173–175°.

(j) 7.6 g. of 4-chloro-5-(1-hydroxy-butyl)-benzofuran-2-carboxylic acid are dissolved in 80 ml. of acetone, the solution is cooled to 0° and a solution of 2.2 g. of $CrO_3$ in 0.5 ml. of concentrated sulfuric acid and 6 ml. of water is added. The reaction mixture is stirred for 30 minutes, diluted with water and extracted with ether. The combined ether layers are dried over magnesium sulfate and concentrated. The residue is recrystallised from benzene/ethyl acetate and yields 5-butyryl-4-chloro-benzofuran-2-carboxylic acid, M.P. 133–134°.

EXAMPLE 4

5-(2-methylene-alkanoyl)-benzofuran-2-carboxylic acids (a) A mixture of 4 g. of 5-butyryl-6-methyl-benzofuran-2-carboxylic acid, 0.82 g. of paraformaldehyde, 1.64 g. of dimethylamine hydrochloride and 40 ml. of dioxan is stirred and refluxed for 5 hours, and then evaporated in vacuo. The residue is refluxed for 2 hours together with 30 ml. of glacial acetic acid and 3 g. of dry sodium acetate. The solvent is evaporated in vacuo and the residue is triturated with 50 ml. of water and acidified with conc. hydrogen chloride to pH 3. The suspension is stirred for about 30 min. The precipitate is removed by filtration, washed with water, dried in vacuo at 60° and recrystallised from benzene/hexane to give 5-(2-methylenebutyryl)-6-methyl-benzofuran-2-carboxylic acid, M.P. 141–142°.

In analogous manner as described above are prepared the following intermediates:

(b) 5 - (2-methylene-butyryl)-6-ethoxy-benzofuran-2-carboxylic acid, M.P. 139–141° (ethanol/water), from 5-butyryl-6-ethoxy-benzofuran-2-carboxylic acid;

(c) 5-(2-methylene-propionyl)-6-methyl-benzofuran-2-carboxylic acid, M.P. 185–186° (ethyl acetate), from 5-propionyl-6-methyl-benzofuran-2-carboxylic acid;

(d) 5-(2-methylene-butyryl)-3,6-dimethyl-benzofuran-2-carboxylic acid, M.P. 152–154° (benzene/heptane), from 5 - butyryl - 3,6 - dimthyl - benzofuran - 2 - carboxylic acid;

(e) 5 - (2 - methylene - butyryl) - 4 - chloro - benzofuran-2-carboxylic acid, M.P. 156–158° (benzene/ethyl acetate), from 5-butyryl-4-chloro-benzofuran-2-carboxylic acid;

(f) 5 - (2 - methylene - valeroyl) - 6 - methyl - benzofuran-2-carboxylic acid, M.P. 160–162° (benzene/ethyl acetate), from 5-valeroyl-6-methyl-benzofuran-2-carboxylic acid.

(g) 5 - (2 - methylene - butyryl) - 6 - ethyl - benzofuran-2-carboxylic acid, M.P. 121–122° (benzene), from 5-butyryl-6-ethyl-benzofuran-2-carboxylic acid.

EXAMPLE 5

$Z_1,Z_2$-substituted benzofuran-2-carboxylic acids (a) A mixture of 50.0 g. of m-ethylphenol. 55.0 g. of malic acid and 100 ml. of concentrated sulfuric acid are slowly heated to 130° while stirring. Stirring is continued for 20 minutes when this temperature is reached. The reaction mixture is then poured on to 2 kg. of crushed ice and extracted with 500 ml. of ether. The ether extract is washed with 200 ml. of saturated aqueous sodium bicarbonate solution, dried over magnesium sulfate and evaporated. The residue consists of crude 7-ethyl-coumarine, which is used without purification.

(b) 30.4 g. of this 7-ethyl-coumarine are dissolved in 40 ml. of chloroform and a solution of 29 g. of bromine in 20 ml. of chloroform are added dropwise thereto. The reaction mixture is stirred and the temperature is kept at 20–25° by immersing the reaction vessel from time to time into an ice bath. Stirring is continued at room temperature after all the bromine is added. The chloroform is then removed under reduced pressure at 50° and the residue is added in portions to a solution of 80 g. potassium hydroxide in 160 ml. of ethanol which was preheated to 30° and is kept between 30 and 40° by cooling the reaction vessel.

The reaction mixture is eventually stirred 30 minutes at room temperature and 30 minutes at 80° and then poured in 1 l. of ice water. The aqueous alkaline solution is washed twice with 300 ml. of ether and then acidified to pH 2–3 with concentrated hydrochloric acid. A precipitate forms, which is filtered off and recrystallised from ethanol. After drying in vacuo, the 6-ethyl-benzofuran-2-carboxylic acid melts at 152–154°.

(c) The other $Z_1,Z_2$-substituted benzofuran-2-carboxylic acids used as starting materials in Example 3 are known and are prepared in accordance with the publications given (see column 2 lines 41–46) of the specification.

The following examples further illustrate the production of tablets and dragées:

EXAMPLE 6

1,000 g. of 5-(2-bromo - 2-bromomethyl-butyryl) - 6-methyl-benzofuran-2-carboxylic acid are mixed with 500 g. of lactose and 270 g. of potato starch, the mixture is moistened with an aqueous solution of 8 g. of gelatine and granulated through a sieve. After drying, 60 g. of potato starch, 60 g. of talcum, 10 g. of magnesium stearate and 20 g. of colloidal silicon dioxide are mixed in and the mixture is pressed into 10,000 tablets each weighing 20 mg. and containing 100 mg. of active substance. If desired, the tablets can be grooved for better adaptation of the dosage.

EXAMPLE 7

A granulate is produced from 1,000 g. of 5-(2-bromo-2-bromomethyl-butyryl) - 6-methyl-benzofuran - 2-carboxylic acid, 345 g. of lactose and the aqueous solution of 6 g. of gelatine. After drying, the granulate is mixed with 10 g. of colloidal silicon dioxide, 40 g. of talcum, 40 g. of potato starch and 5 g. of magnesium stearate and the mixture is pressed into 10,000 dragée cores. These are then coated with a concentrated syrup consisting of 533 g. of crystallised saccharose, 20 g. of shellac, 75 g. of gum arabic, 250 g. of talcum, 20 g. of colloidal silicon dioxide and 1.5 g. of dyestuff, and dried. The dragées obtained each weigh 240 mg. and contain 100 mg. of active substance.

What we claim is:

1. A compound of the Formula I

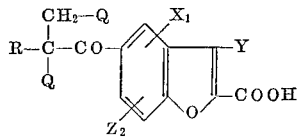

(I)

wherein

Q is chloro or bromo;

R is hydrogen or lower alkyl;

Y is hydrogen or methyl; and each of $Z_1$ and $Z_2$ taken individually is hydrogen, lower alkyl, lower alkoxy, fluoro, chloro or bromo; and the pharmaceutically acceptable salt of said compound with a base.

2. A compound according to claim 1 which compound is 5-(2-bromo-2-bromomethyl-butyryl) - 6-methyl-benzofuran - 2-carboxylic acid.

References Cited

UNITED STATES PATENTS 3,321,491   5/1967   Huffman et al. _____ 260—346.2

ALEX MAZEL, Primary Examiner

B. I. DENTZ, Assistant Examiner

U.S. Cl. X.R.

424—285